United States Patent
Lau (10) Patent No.: US 12,003,902 B2
(45) Date of Patent: Jun. 4, 2024

(54) SYSTEM AND METHOD FOR TRANSMITTING INFORMATION

(71) Applicant: Sentronic GmbH Gesellschaft für Optische Messsysteme, Dresden (DE)

(72) Inventor: Matthias Lau, Dresden (DE)

(73) Assignee: Sentronic GmbH Gesellschaft fur Optische Messsysteme, Dreseden (DE)

( * ) Notice: Subject to any disclaimer, the term of this patent is extended or adjusted under 35 U.S.C. 154(b) by 351 days.

(21) Appl. No.: 17/013,715

(22) Filed: Sep. 7, 2020

(65) Prior Publication Data

US 2020/0413165 A1    Dec. 31, 2020

Related U.S. Application Data

(63) Continuation-in-part of application No. 15/735,208, filed as application No. PCT/EP2016/063473 on Jun. 13, 2016, now abandoned.

(30) Foreign Application Priority Data

Jun. 15, 2015 (DE) .......................... 102015210880.5

(51) Int. Cl.
*H04Q 9/00* (2006.01)
*G08B 7/06* (2006.01)
*H04B 5/79* (2024.01)

(52) U.S. Cl.
CPC ................. *H04Q 9/00* (2013.01); *G08B 7/06* (2013.01); *H04B 5/79* (2024.01)

(58) Field of Classification Search
CPC .......... H04Q 9/00; G08B 7/06; H04B 5/0037; H04B 5/79
See application file for complete search history.

(56) References Cited

U.S. PATENT DOCUMENTS

2008/0240988 A1* 10/2008 Wakamiya ....... G01N 35/00693
422/68.1
2010/0110439 A1    5/2010 Gruler
(Continued)

FOREIGN PATENT DOCUMENTS

| CL | 201703214 | 7/2018 |
| CN | 104457822 A | 3/2015 |

(Continued)

OTHER PUBLICATIONS

Anonymous: Samsung Galaxy S6—Wikipedia, Jun. 13, 2015 (Jun. 13, 2015), pp. 1-5, XP055296727, Retrieved from the Internet: URL:https://de.wikipedia.org/w/index.php?title=Samsung_Galaxy_S6&oldid=143062615 [retrieved on Aug. 22, 2016] The Whole Document.

(Continued)

*Primary Examiner* — Mohamed Charioui
*Assistant Examiner* — Xiuqin Sun
(74) *Attorney, Agent, or Firm* — Heslin, Rothenberg, Farley & Mesiti P.C (57) ABSTRACT

A system and a method for transmitting information between a first unit and a second unit, wherein the second unit does not contain its own energy source sufficient for the transmission of information and includes measuring devices for determining various properties and/or substances in the environment of a transducer or the transducer itself as a component of the particular measuring device. The measuring devices are in particular characterised in that they are simple and robust to control and their function can be influenced. For this purpose, the measuring device comprises at least one transducer as a component of a second unit/passive device and/or as a component of first unit/an active measuring functional unit. The first unit/active measuring functional unit further consists of a data-processing system and a transceiver unit for electromagnetic radiation, and is interconnected to an electric power source.

30 Claims, 4 Drawing Sheets

(56) References Cited

U.S. PATENT DOCUMENTS

| | | | |
|---|---|---|---|
| 2012/0040608 A1* | 2/2012 | Walker | H04W 52/0258 |
| | | | 455/13.2 |
| 2012/0236306 A1 | 9/2012 | Ostermeyer | |
| 2012/0280044 A1 | 11/2012 | Mullis et al. | |
| 2013/0211761 A1 | 8/2013 | Brandsma et al. | |
| 2014/0004548 A1 | 1/2014 | Gordon et al. | |
| 2014/0057609 A1 | 2/2014 | Vaananen | |
| 2014/0086586 A1* | 3/2014 | Voutilainen | H04M 1/003 |
| | | | 398/118 |
| 2014/0211204 A1 | 7/2014 | Stedtfeld et al. | |
| 2014/0218718 A1 | 8/2014 | Mander et al. | |
| 2018/0151054 A1* | 5/2018 | Pi | G08B 21/245 |

FOREIGN PATENT DOCUMENTS

| | | |
|---|---|---|
| DE | 10255741 A1 | 6/2004 |
| DE | 102009028794 A1 | 2/2011 |
| DE | 102009047538 A1 | 6/2011 |
| DE | 102011005807 A9 | 9/2012 |
| DE | 102012014503 A1 | 1/2014 |
| EP | 0780822 A1 | 6/1997 |
| EP | 2434291 A1 | 3/2012 |
| EP | 2836269 | 10/2013 |
| EP | 2829228 A1 | 1/2015 |
| WO | 2010085736 A1 | 7/2010 |
| WO | 2013155199 A1 | 10/2013 |

OTHER PUBLICATIONS

Last Office Action in parent U.S. Appl. No. 15/735,208 (attached).

\* cited by examiner

SYSTEM AND METHOD FOR TRANSMITTING INFORMATION

CROSS REFERENCE TO RELATED APPLICATIONS

This application is a continuation-in-part of U.S. Ser. No. 15/735,208, filed on 2017 Dec. 11, which is the US. national stage of International Application No. PCT/EP2016/063473, filed on 2016 Jun. 13. The international application claims the priority of DE 1020152108805 filed on 2015 Jun. 15; all applications are incorporated by reference herein in their entirety.

BACKGROUND

The invention relates to a system and a method for transmitting information between a first unit and a second unit, wherein the second unit does not contain an own energy source sufficient for the transmission of information.

Technical systems require power and generally also have corresponding interfaces for exchanging information. For the purpose of communication, radio links using electromagnetic radiation or conductors in the form of optical waveguides or electrical conductors are used. Power is usually supplied via electrical cables, integrated power sources or decentral power sources.

Electrical or optical connectors are usually very prone to faults under harsh environmental conditions, such as in sewage plants, fish-farming plants, when mining, or in plants prone to explosion, and are expensive. Inserting such connectors or protecting open connectors under harsh environmental conditions of this type is complicated and likely to incur faults, for example at low temperatures or on very rocky sea-based fish-farming plants.

Specific transducers, such as electrodes, become worn and have to be replaced intermittently. Such electrodes can be connected to a first unit, also called an active measuring functional unit. The signal strengths are low and are thus already very prone to interference in the event of poor transmission. Electrical connectors are prone to faults and/or are expensive, and cannot be safely handled under dirty and/or moist conditions. EP 1 206 012 B1 discloses alternatives. One disadvantage of said alternatives is that extensive communication between a second unit, also called a passive device, including the transducer, formed as a pH electrode in this case, and the first unit/active measuring functional unit is not provided, since sufficient bidirectional data processing is not provided on the second unit/passive device. The simultaneous use of more than one second unit/passive device and/or the combination of more than one transducer on the second unit/passive device and/or the first unit/active measuring functional unit is not provided.

DE 10 2011 005 807 A9 discloses a cuvette and an optical measuring apparatus. The cuvette comprises an information transmitter for wirelessly sending data relating to the cuvette, which are to be transmitted, to an external data-receiving module, the information transmitter being fixed to the cuvette wall. The cuvette can also be a component of an optical measuring device here. The data relating to the cuvette are wirelessly transmitted to a receiver.

DE 10 2011 005 807 A9 discloses a cuvette and an optical measuring device that comprises the cuvette. Said cuvette is in particular a sample cell for an apparatus for measuring a temperature-dependent, optical parameter of a fluid sample in a polarimeter. The cuvette comprises an information sensor for wirelessly providing data relating to the cuvette, the information sensor being formed as an active or a passive information sensor. In this case, specific, optically obtained measured data, temperature data and data that define the cuvette, for example in the form of calibration data or geometry data, can be transmitted. The cuvette and the optical measuring device are limited to recording data and transmitting them to a data-receiving module.

US 2014/0 218 718 A1 contains an analytical system for substances that are exposed to electromagnetic radiation for that purpose. The electromagnetic radiation received reaches detectors that can communicate with a data network in order to transmit the measured data. This relates to a photometric/spectrometric measuring method. Wireless transmission of data and power is not provided.

US 2014/0 211 204 A1 discloses a sensor module, which comprises an active power supply, sensory components and a radio link that is known from the field of communication technology. Furthermore, US 2010/0 110 439 A1 includes an optical measuring instrument, which can comprise an active power supply, the sensory components and a classic radio link in addition to wired communication. These solutions do not relate to passive components. Communication and the provision of power are carried out via separate paths.

DE 10 2012 014 503 A1 discloses a gas-measuring system for measuring the concentration of gaseous and/or vaporous components of a gas mixture by means of a change in colour of at least one reagent. The change in colour is detected and can be read out by means of a reader for an electronic data store using the measured data. For this purpose, the data store can be a component of a known RFID chip, which can be read out by means of alternating magnetic fields or radio waves.

WO 2010/085 736 A1 discloses a chlorophyll and turbidity sensor system. The system is wirelessly connected to a data receiver in order to communicate the measured data. Said receiver is also coupled to a display unit and/or a control unit.

SUMMARY

The invention relates to a system and a method for transmitting information between a first unit and a second unit, wherein the second unit does not contain an own energy source sufficient for the transmission of information, and includes measuring devices for determining physical properties, chemical properties, biological properties and/or substances in the environment of at least one transducer or of the at least one transducer itself as a component of the particular measuring device. The measuring devices are in particular characterised in that they are simple and robust to control and their function can be influenced. For this purpose, the measuring device consists of at least one transducer as a component of a second unit/passive device and/or as a component of first unit/an active measuring functional unit. The first unit/active measuring functional unit further consists of a data-processing system and a transceiver unit for electromagnetic radiation, and is interconnected to an electric power source. Furthermore, the transceiver unit of the active measuring functional unit is wirelessly connected to at least one transceiver unit, for electromagnetic radiation, of at least one second unit/passive device that     comprises at least one operating element,
    comprises at least one switch,
    is designed for controlling the measuring device,
    is designed for signalling,
    is designed for obtaining measured values,
    is designed for displaying an operating state, is designed for calibrating the transducer,
is formed as a data medium, and/or
is formed as a data store.

DETAILED DESCRIPTION

The object of the invention is that of controlling a measuring device in a simple manner or influencing its function.

This object is achieved by a system and a method for transmitting information between a first unit and a second unit.

The measuring devices for determining physical properties, chemical properties, biological properties and/or substances in the environment of at least one transducer or of the at least one transducer itself as a component of the particular measuring device are characterised in particular in that they can be easily controlled and their function can be influenced.

For this purpose, the measuring device comprises a first unit/an active measuring functional unit, at least one second unit/passive device that therefore does not comprise a power source, and at least one transducer, wherein the at least one transducer can be part of the first unit and/or part of the second unit.

The first unit further comprises at least one data-processing system and one transceiver unit for electromagnetic radiation and is connected to an electrical power source.

Furthermore, the transceiver unit of the measuring functional unit is wirelessly connected to at least one transceiver unit, for electromagnetic radiation, of at least one second unit that
    comprises at least one operating element in conjunction with at least one switch as a component of an electrical circuit,
    is designed for controlling the measuring device,
    is designed for signalling,
    is designed for displaying an operating state,
    is designed for transferring measured and/or reference values,
    is designed for calibrating specific transducers,
    is formed as a data medium, and/or
    is formed as a data store.

The electromagnetic radiation, also known as electromagnetic waves, is electromagnetic radiation that transmits power and either signals and/or data such that the at least one second unit in conjunction with the first unit and at least one transducer forms the measuring device.

The first unit forms an active sensor together with the at least one transducer, which can be targetedly and specifically influenced and/or brought to provide (user) feedback by means of the second unit.

The first unit provides the active part of the measuring device and can be mobile.

The second unit, together with the at least one transducer, forms a passive sensor that targetedly and specifically influences the first unit and/or is influenced by the first unit.

The second unit is a self-contained system, which can be integrated in a fully contained housing. It is preferable for said housing to comply with IP67/IP68, to be chemically and/or biochemically resistant, to be non-toxic and to be non-carcinogenic. It can thus also be used under harsh environmental conditions, such as damp environments. Furthermore, depending on the intended use, said second unit can be designed so as to have a wide range of uses. This can be for identification purposes, as a measuring and/or control unit or as a status indication. The second unit can also be used on its own or in combination with at least one additional second unit at the same time and/or in parallel. Electrical supply lines and contacts are not required for it to function.

The second unit can be simply configured or programmed by a device provided externally thereto or by the first unit itself via the transceiver unit of the second unit.

The pulses, signals, data and/or programs in the form of software sent by the second unit influence the data-processing system of the first unit accordingly. These are in particular identified for this purpose and can be stored, forwarded, processed and/or executed.

The second unit can contain an electrical power store in the form of a temporary store, so that a fluctuating supply of power via the wireless transmission of power and/or a fluctuating consumption of power can be compensated for. Capacitors can be used as the temporary store. Furthermore, the second unit can compensate for a fluctuating or insufficient consumption of power by means of additional wireless transmissions of power by photometric, thermal or acoustic energy converters, for example.

The at least one transceiver unit in the first unit and in the second unit comprises at least one antenna or coil to ensure electromagnetic coupling (power, signal and/or data transmission) between the at least one first unit and the at least one second unit in each case. In order to allow these to function at the same time, more than one antenna or coil can also be used in different positions. These are preferably then connected in series. This is, for example, used when a second unit having a sensitive layer/diaphragm (for example a fluorescence layer) is integrated in a replaceable measuring cap, for example, which is fixed on the housing of an active measuring device for coupling/use purposes, and a calibration cuvette in the form of a passive device, for example, is intended to be used in parallel and/or at the same time, the geometric or functional construction of which does not allow the first antenna or coil to be used.

Furthermore, the at least one first unit and the at least one second unit are preferably electromagnetically coupled in the near field in order to prevent cross-talking of the coupling when more than one coupling point is used in parallel and/or at the same time. Near-field communication preferably takes place at a frequency of 13.56 MHz and a maximum data transmission rate of 424 kBits/s. Communication is preferably cryptographically secured.

When a first unit and a second unit are coupled, they generate a high-frequency magnetic field (electromagnetic field) between the loosely coupled antennae or coils both in the first unit and in the second unit. As soon as the field is created, a connection is established, preferably by the first unit, and information can be exchanged.

The passive measuring unit comprising a transceiver unit for electromagnetic radiation can be a separate measuring unit or can be designed in accordance with the second unit.

According to an embodiment, the electrical power source for the first unit in conjunction with the data-processing system and the transceiver unit is electric mains, an accumulator, a power converter or a combination thereof. A power converter is in particular a known wind turbine, wave power station, hydroelectric power station, thermal power station, acoustic energy plant, tidal power station or solar power system, all of which convert the particular energy into electrical energy.

According to an embodiment, the transducer is an electrochemical sensor, a biochemical sensor, an optical sensor, a semiconductor sensor, a solids sensor, a microsystem, an electrode, an optrode, a physical sensor element or a combination thereof.

According to an embodiment, the second unit comprises a data-processing system that is connected to the operating element, the switch, the signalling system, the display, the data medium, the data store, a measured value transducer and a measuring transmitter depending on its function.

The data-processing system is therefore a component of a control device. For this purpose, the data-processing system can be configured, can contain corresponding software, so that at least one specific function can be triggered. This can be calibrating the transducer, for example, wherein corresponding reference conditions are provided and the measured value from the transducer is made to correlate with the reference value by means of specific and/or defined processes/sequences, which changes the current property of the transducer.

According to an embodiment, the second unit for calibrating the transducer is a calibration cuvette, which provides the reference conditions, triggers the calibration function and advantageously provides status messages, either continuously or at the end of the function.

According to an embodiment, the calibration cuvette in the form of a passive sensor advantageously comprises at least one pressure sensor, one temperature sensor, one pH sensor, one conductivity sensor and/or one moisture sensor in each case. In addition to the reference conditions, for example the oxygen concentration in the case of an oxygen sensor, environmental conditions that are determined by the pressure sensor, the temperature sensor, the pH sensor, the conductivity sensor and/or the moisture sensor, for example, can also be detected and transmitted to an active measuring functional unit.

According to an embodiment, the second unit comprising the switch is a starting or ending switch in conjunction with the transducer by means of the data-processing system of the first unit. The second unit can have switching functions, which can be triggered in the first unit. Activation can either be automatic in accordance with a radio link (coupling) of the second unit to the first unit or can be carried out at the second unit as a result of user interaction.

According to an embodiment, the second unit in the form of a data store is a passive device containing data in the form of times, identification data, codes, actual values, reference values, software, a mathematical function, linearisation parameters, calibration parameters and/or an algorithm for influencing the data-processing system of the active measuring functional unit.

According to an embodiment, the calibration cuvette in the form of a second unit is connected to the first unit and to at least one transducer (active sensor) such that at least two reference values are passed to the transducer, preferably subsequently or following user interaction. The transducer thus provides at least one two-point calibration and/or determines reference conditions.

According to an embodiment, the data-processing systems of the first unit and of the second unit are connected to one another by means of the respective transceiver units in order to transmit signals and/or data so as to influence the mode of operation of the particular data-processing system. Programs and data can thus be exchanged and executed accordingly. These are in particular the measured data obtained by the transducer, commands or configurations.

According to an embodiment, the second unit for signalling is a passive device that emits at least one optical and/or at least one acoustic signal. Therefore, in particular the operating state and the operational readiness of or success messages from the measuring device or parts thereof can be displayed. This can also be done using threshold values, such that specific operating states determined by the threshold values can be signalled.

According to an embodiment, the operating element of the second unit is at least one key and/or at least one switch in conjunction with a data-processing system of said passive device. Specific functions in conjunction with the active sensor can therefore be triggered.

According to an embodiment, the second unit comprises at least one sensor element, wherein the second unit is a passive device comprising the at least one sensor element or wherein the sensor element is connected to the data-processing system of the second unit. The sensor element can be a temperature sensor, a pressure sensor, a moisture sensor, a pH sensor, a conductivity sensor, a gas sensor, an electrochemical sensor, a biochemical sensor or an optical sensor, or an electrode, optrode or physical sensor element.

Specific operating modes determine the measured values in the data-processing system on the basis of the sensor element(s) and then transmit them either actively or upon request to a first unit.

These data can then be recorded, stored, processed and/or transmitted using corresponding algorithms, for example in an FPGA or a software/firmware of the data-processing system of the first unit.

The second unit in the form of a passive sensor comprises at least one sensor/measured value transducer of its own and the measured values thereof are transferred via the respective transceiver units by the first unit or the measuring device. Therefore, the range of functions of the measuring device can temporarily or continuously be changed. This can be done for compensation purposes, for example. Therefore, a sensor for measuring gases in the atmosphere or gases dissolved in liquids, for example, can be expanded by a pressure sensor for use at different altitudes or depths. This can be done for referencing purposes. Therefore, when calibrating oxygen sensors or carbon dioxide sensors, for example, a barometric pressure sensor can measure the ambient pressure required and send it to the active sensor first unit plus at least one transducer), or a gas sensor can measure the present gas concentration and transmit it to the first unit. For example, a pH electrode forming part of the second unit can therefore also determine the pH value and transmit it to the first unit without electrical contact elements and in a galvanically separated manner. This can also be carried out, for example, in order to determine complex sum parameters. Therefore, a sensor for measuring dissolved oxygen can be expanded for use in salt water by the function of the conductivity sensor in order to determine the salinity. If said sensor is used in drinking water again, the second unit can be removed.

According to an embodiment, the transceiver unit for electromagnetic radiation and the first unit are releasably connected. Furthermore, the transceiver unit is interconnected to the first unit and to the electrical power source. For this purpose, the transceiver unit can advantageously be formed as a cap that can be screwed on by means of a screw connection or slid on by means of a clamping connection.

According to an embodiment, the transceiver unit for electromagnetic radiation, which unit can be connected to the first unit, is connected to a data medium, a data store and/or an additional data-processing system. Therefore, data from the data-processing system of the active sensor can be transmitted as usage information either cyclically or according to specific processes, such as a calibration. The user can connect the cap to a different active sensor so that usage data are automatically transmitted to the data-processing system of the other active sensor.

The system according to the invention is used for transmitting information between a first unit (active functional measuring unit) and a second unit (passive device). The system comprises therefore the first unit and the second unit and a transducer. The transducer is a component of the first unit or of the second unit and makes that unit which comprises the transducer to a measuring device. Nevertheless, both of the first and the second unit may contain a transducer or even a plurality of transducers. The first unit comprises an electrical power source, at least one data-processing system and a first transceiver unit for electromagnetic radiation. The second unit does not contain an electrical power source, i.e. at least no electrical power source providing energy which is sufficient for transmitting information to the first unit via electromagnetic radiation. Therefore, the first unit is also called an active measuring functional unit and the second unit is also called a passive device. The second unit comprises a second transceiver unit for electromagnetic radiation. The first transceiver unit and the second transceiver unit are configured to be wirelessly connected via an electromagnetic coupling in the near field, such that power is transmitted from the first unit to the second unit and signals or data are transmitted from the second unit to the first unit or from the first unit to the second unit. That is, the transmitted power enables the second transceiver unit to transmit and receive signals and data to or from the first unit. The second unit contains a feedback device that is configured to emit an optical and/or an acoustic signal corresponding to at least one feature from the group comprising the operating state and the readiness for use of the first or the second unit and the confirmation regarding operations of the system that have been carried out.

Thus, a user which wants to transmit information, e.g. control commands or calibration data or measured data, between the first and the second unit gets a feedback, for instance about the correct and complete execution of the transmittance or of controls triggered by the transmitted information, even if there is no signal display directly at the first unit.

The system is particularly useful for applications in normally difficult conditions. By way of example, one application is described in more detail in the following. A fish-farming plant normally comprises a high number of sensor units each comprising a transducer. These sensor units are configured to repeatedly measure specific parameters of their ambient, for instance the water temperature or the concentration of nutrient or of waste within the water. The sensor units are provided with an energy source in order to do the measurement, to process the measured values where applicable and to transmit the measured values or processed data based on the measured values to a control unit. The control unit normally is arranged far away from the sensor unit, e.g. more than 5 m, often more than 20 m to 30 m and sometimes even more than several hundred meters. The energy source may be the main or a battery or any energy-harvesting device and the sensor units transmit the values or data wirelessly or per wire. In the sense of the invention, each of these sensor units is a first unit. Since the sensor units are provided in a rigid ambient, here for instance water, they normally do not comprise a display or any other feedback device, and the only place for monitoring and displaying a status of the sensor unit is at the control unit.

From time to time, it is necessary to calibrate the sensor units or to provide them with new configuration data or a new programming. Sometimes it is even necessary to verify whether the sensor units work correctly. All these operations may either not be done or monitored from far away, i.e. from a control unit or via the internet, or a transmission of data is not possible with the maximum available transfer rate (transmission rate, baud rate) of the installed Bus system or not secure, e.g. a wireless transmission via the mobile telecommunication network can be hacked. Therefore, these operations should be carried out in direct ambient of the specific sensor unit, i.e. in a near field of the sensor unit. If the control unit is far away from the sensor unit as explained above, a person executing a calibration, e.g. under different reference conditions or with different calibrations fluids, or a new configuration of the sensor unit, would need to move several times between one or more sensor units and the control unit in order to monitor the process, which is time-consuming and results in high costs.

The inventive system provides the possibility to perform operations based on a transmission of information in the direct ambient of the sensor unit and to get an feedback about the successful execution of the operation or an status of the sensor unit in the direct ambient of the sensor unit. Information needed for the operation is secured within the second unit and provided to the sensor unit, i.e. the first unit, by the second unit, wherein the second unit can only transmit information in the near field of the first unit. This reduces the risk that information can be hacked or altered during transmission and further provides the advantage that there is no need for a feedback transmission between a control unit and a user being in the direct ambient of the sensor unit. Furthermore, the user does not need specific qualifications with respect to the performed operations, all necessary information is provided by the second unit.

In embodiments, the feedback device is a lamp, e.g. a light-emitting diode, or a display. In other embodiments, the feedback device gives an acoustic feedback and is an acoustic system, e.g. a loudspeaker or a piezoelectric sound system.

In embodiments, the electrical power source is electric mains, an accumulator, a power store, a power converter or a combination thereof.

In embodiments, the transducer is an electrochemical sensor, a biochemical sensor, an optical sensor, a semiconductor sensor, a solids sensor, a microsystem, an electrode, an optrode, a physical sensor element or a combination thereof.

In embodiments, the second unit comprises a data-processing system.

In embodiments, the second unit is a calibration cuvette configured to calibrate the transducer being a part of the first unit and to be releasable connected to the first unit in such a way that the transducer is in contact with an calibration medium. The second unit has a light-emitting diode as the feedback device and is configured to start a calibration function within the first unit.

In embodiments, the second unit comprises a switch and is configured to start, select or end a function in the first unit. The switch of the second unit may be part of a data-processing system of the second unit or may be any kind of automatically performing switch or may be an operating element configured to be controlled directly by a user. In any case, the switch is able to start or end a function of or within the first unit.

In embodiments, the second unit contains an operating element configured to be controlled directly by a user. In particular, the operating element of the second unit may be a key or a switch or a touch screen in conjunction with a data-processing system of said second unit.

In embodiments, the second unit comprises a data store containing data in the form of times, identification data, codes, reference values, actual values, software, a mathematical function, linearisation parameters, calibration parameters, or an algorithm for influencing the data-processing system of the first unit.

A method according to the invention for transmitting information between a first unit and a second unit comprises the steps of:
  providing a system according to the invention,
  storing at least one first item of information in the second unit,
  establishing a wireless connection between the first unit and the second unit in the near field of the first unit, and transmitting power from the first unit to the second unit,
  transmitting at least one of the at least one first item of information from the second unit to the first unit via the wireless connection,
  performing an operation at least within the first unit according to the transmitted information, and
  at any point of time after establishing the wireless connection, emitting an optical and/or an acoustic signal by the feedback device thereby giving a feedback regarding at least one feature from the group comprising the operating state of the first unit, the readiness for use of the second unit or of the first unit, the confirmation regarding operations that have been executed, a status value of the first unit, a measured value, a calibration value and a reference value.

The method may be used for the purpose of the configuration, control, compensation or programming, or for the calibration or for the identification of the first unit or of a transducer in the first unit of a system according to the invention. In this case, the at least one first item of information stored in the second unit is an item from the group consisting of identification data, configuration data, compensation data, software codes, control commands and calibration data. Furthermore, compensation data or calibration data or configuration data may not be stored from outside in the second unit, but may be determined by the second unit and then be stored in the second unit. At least one of the at least one first item of information is transmitted from the second unit to the first unit.

The method may also be used for requesting the status of the first unit or of a transducer in the first unit or for requesting stored data of the first unit or of a transducer in the first unit. In this case, identification data or at least one control command is stored in the second unit as the at least one first item of information and is transmitted from the second unit to the first unit. Further, the method may be used for selecting functions or configurations inside the first unit, wherein at least one control command is stored in the second unit as the at least one first item of information and is transmitted from the second unit to the first unit.

Further, the method may be used for transmission of measured values from a transducer in the second unit or for configuration, control, generation of measured values, calibration or referencing of a transducer in the second unit by means of the first unit. In this case, at least on item of the group comprising identification data and at least one control command is stored in the second unit as the first item of information which is transmitted to the first unit.

The operation performed within the first unit may be executing the transmitted control commands or software codes or implementing the configuration data, compensation data, software codes, control commands or calibration data into the data-processing system of the first unit or into a measurement system of the transducer being a part of the first unit or performing a calibration of the transducer in the first unit. Further, the performed operation may comprise a transmission of at least one second item of information from the first unit to the second unit via the wireless connection, wherein the second item of information is at least one from the group consisting of confirmation of a performed operation, status data or stored data of the first unit.

Moreover, the performed operation may be transmitting configuration data, compensation data, control commands and calibration data from the second unit to the first unit or from the first unit to the second unit via the wireless connection, or activating the transducer in the second unit and carrying out at least one measurement using the transducer in the second unit. The obtained measurement result or a processing result obtained by processing the measurement result may then be transmitted from the second unit to the first unit via the wireless connection. Further, the measurement result or the processing result may then be further processed in the first unit. That is, a part of the operation may also be performed within the second unit or may be a transmission of information between the first and the second unit. Each information transmitted from the first unit to the second unit is called a second item of information.

The signal giving a feedback may be emitted by the feedback device of the second unit as soon as the wireless connection is established. That is, the feedback device may first give a signal referring to successful establishing of the wireless connection, i.e. to readiness of operation of the second device. In further progress of the method, the feedback device may give a signal referring to other features, like an operating state of the first unit and the confirmation regarding a performed operation, i.e. whether an operation was performed successfully or incorrectly. Further, a signal regarding a status value of the first unit, a measured value, a calibration value and a reference value may be emitted.

The wireless connection between the first unit and the second unit can be interrupted, i.e. the second unit can be removed from the near field of the first unit, as soon as no further transmissions between the first unit and the second unit are necessary for performing the operation and/or for transmitting an information needed for emitting a signal by the feedback device. As is understood by a person skilled in the art, a signal regarding a feature connected with the first unit, e.g. an operation performed within the first unit or an operation state of the first unit, can only be emitted by the feedback device, if a respective information is transmitted from the first unit to the second unit.

In embodiments, the step of performing an operation at least within the first unit comprises transmitting at least one second item of information from the first unit to the second unit and storing the second item of information in the second unit. Thus, identification data or configuration data or compensation data or measured data or calibration data or status data or other stored data from the first unit may be stored in the second device and may therefore be processed, e.g. analysed, after terminating the method according to the invention.

Another system useful for the described purposes is a system for transmitting information between a first unit and at least two second units. Thus, the system contains the first unit, at least two second units and a transducer. The transducer may be a component of the first unit or of one of the second units. The first unit comprises an electrical power source, at least one data-processing system and a first transceiver unit for electromagnetic radiation as described above. Each of the second devices does not contain an electrical power source, but does contain a second transceiver unit for electromagnetic radiation as described above. The first transceiver unit and the second transceiver units are configured to be wirelessly connected, via an electromagnetic coupling in the near field, such that power is transmitted from the first unit to the second units and signals or data are transmitted from the second units to the first unit or from the first unit to the second units. In order to be able to simultaneously, i.e. in parallel, transmit or receive information to or from the at least two second units, the first transceiver unit comprises at least two antennae that are arranged at different positions, or the first unit further comprises a third transceiver unit for electromagnetic radiation, each of the first and the third transceiver units containing at least one antenna.

One of the second units may be a calibration cuvette for calibrating a transducer of the first unit and another one of the second units may be a control device for controlling the calibration operation, e.g. to start and end the calibration operation or to monitor the operating state of the first unit. For the last case, the respective second device may comprise a feedback device as described above.

Another system useful for the described purposes is a system for transmitting information between a first unit and a second unit, wherein the second unit contains a transducer that comprises an optically sensitive layer. This transducer, called a second transducer, is configured to collect energy from light or to receive or transmit information to or from another device via light.

Nevertheless, the system again comprises the first unit and the second unit and at least another transducer, called a first transducer, which may be a component of the first unit or of the second unit. The first unit comprises an electrical power source, at least one data-processing system and a first transceiver unit for electromagnetic radiation. The second unit does not contain an electrical power source, but does contain a second transceiver unit for electromagnetic radiation. The first transceiver unit and the second transceiver unit are configured to be wirelessly connected, via an electromagnetic coupling in the near field, such that power is transmitted from the first unit to the second unit and signals or data are transmitted from the second unit to the first unit or from the first unit to the second unit. Due to the second transducer, the second unit may perform some operations even without being in the near field of the first unit, i.e. without receiving power from the first unit via electromagnetic coupling in the near field. Alternatively, the second unit may not only receive power from the first unit via electromagnetic coupling in the near field, but may receive power from the first unit or another device or the ambient of the second device via light when coupled to the first unit in the near field. Furthermore, also information can be transmitted between the second unit and the first unit or another device via light. Thus, power transmittance and/or information transmittance between the first unit and the second unit may be increased or accelerated, since two ways for power collection within the second unit and/or two ways for information transmittance are available.

An embodiment of the invention is shown schematically in each of the drawings, and will be described in more detail in the following.

DETAILED DESCRIPTION OF THE PREFERRED EMBODIMENTS

The measuring devices for determining physical properties, chemical properties, biological properties and/or substances in the environment of at least one transducer or of the at least one transducer itself as a component of the particular measuring device substantially consists of the transducer, the at least one first unit together with its data-processing system, its connection to at least one transceiver unit for electromagnetic radiation, its electrical power source, and at least one second unit, which comprises a transceiver unit for electromagnetic radiation and comprises at least one operating element in conjunction with at least one switch as a component of an electrical circuit, comprises at least one switch as a component of an electrical circuit, is designed for controlling the measuring device, is designed for signalling, is designed for displaying an operating state, is designed for transmitting measured and/or reference values, is designed for calibrating the transducer, is formed as a data medium, and/or is formed as a data store.

In this case, the electromagnetic radiation is electromagnetic radiation that transmits power and either signals and/or data, preferably in the near field (NFC), such that the second unit forms a measuring device together with the first unit and the transducer.

In a first embodiment, the second unit can be a calibration cuvette.

Figure 1:
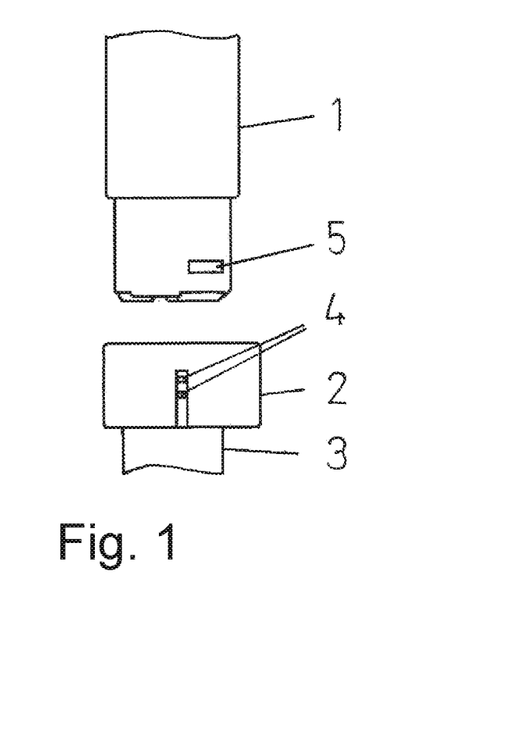
FIG. 1 shows a measuring device comprising a first unit and a second unit in the form of a cuvette.
Figure 2:
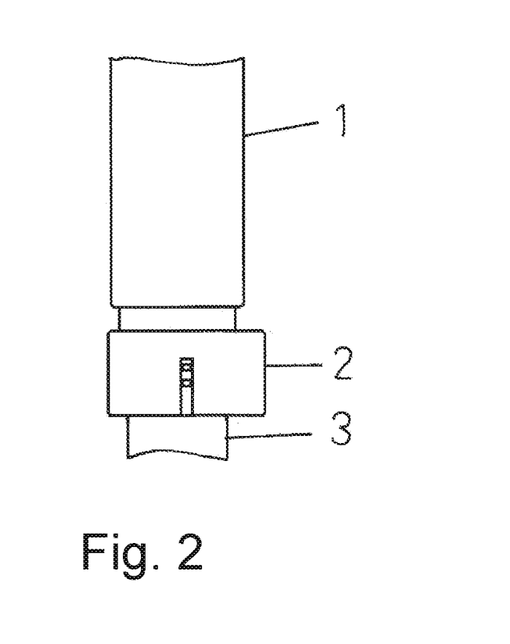
FIG. 2 shows a measuring device comprising a first unit in a second unit in the form of a cuvette.

In this regard,

FIG. 1 is a schematic view of a measuring device comprising a first unit 1, a transducer 5 and a second unit 2 in the form of a cuvette 3 including the lamp 4 for signaling, the second unit being located here outside the electromagnetic radiation (field) used, and FIG. 2 is a schematic view of said second unit 2 in the form of a cuvette 3 located inside the electromagnetic radiation used between the first unit 1 and the second unit 2 such that the second unit is active.

If a first unit 1 comprising a transducer 5 is to be calibrated in the field, i.e. in the field of application, a reference medium has to be provided on the sensitive part and therefore on the transducer 5. In the transducer 5 for dissolved oxygen, this can be done by means of a cuvette 3, for example, which is filled with a corresponding calibration solution, or, in the case of fluorescence optical sensors for pO2/dissolved oxygen, with a calibration gas. The calibration medium in the form of a solution or gas can also be provided by a sponge impregnated therewith or as part of a flow (gas cuvette).

A cuvette 3 of this type has to be handled according to specific requirements, this most often requiring said cuvette to be directly mounted on or around the transducer 5 and the initiation of the calibration/adjustment function on the measuring device, usually at the cable end of the first unit 1, i.e. remote from the transducer 5 that is subjected to the reference conditions. In the use example, the transducer, mounted on the first unit 1 in this case, can also be inserted into the cuvette 3 in order to achieve the reference conditions. The calibration function is advantageously triggered by means of the second unit 2 of the cuvette 3. This can be a component of the cuvette 3 or is a separate device arranged on the cuvette 3. The second unit 2 contains a data-processing system in conjunction with the transceiver unit for electromagnetic radiation. For this purpose, the transceiver unit consists of a known transmitter and receiver or a combination of a transmitter and receiver in conjunction with an antenna/coil in each case. The data-processing system of the second unit is connected to at least one lamp 4. Said lamp can be one or more known light-emitting diodes, in particular different-coloured light-emitting diodes. Furthermore, the second unit 2 can be provided with at least one additional sensor element, which is connected to the data-processing system of the passive device. The sensor element can be a temperature or pressure sensor.

In order to be calibrated using the cuvette 3, the transducer 5 mounted on the first unit 1 is in contact with the medium. For this purpose, the second unit 2 can be formed as a cap or tube section. After assembly, the cuvette is detected by the first unit 1 and the connection between the transceiver units of the active measuring functional unit 1 and of the second unit 2 is established. The operational readiness of the second unit 2, created by the electromagnetic radiation, is displayed by means of the lamp 4. In the simplest case, the operational readiness simultaneously causes the first unit 1 to start the function of calibrating the transducer 5 by means of the data-processing system thereof. At the end of said function, a corresponding signal is sent from the first unit 1 to the second unit 2, which in turn leads to the actuation of an additional lamp or of the lamp 4. The cuvette 3 can be removed once again or filled with the next reference medium in order to repeat the process.

Said process can therefore be easily controlled on-site. Due to its passive nature, the passive device is constantly ready for use.

In addition to the operating modes, data can of course also be transmitted so that measured data, permissions or specific measurement conditions can be exchanged.

Figure 3:
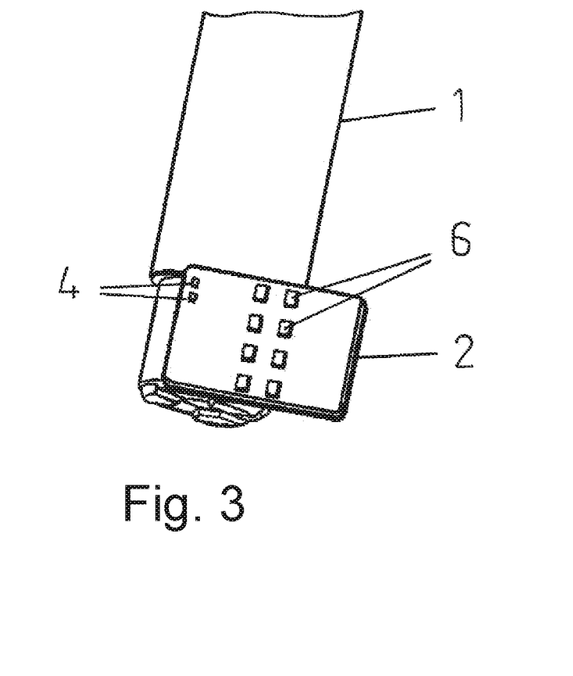
FIG. 3 shows a measuring device comprising a first unit and a second unit for controlling the measuring device.

FIG. 3 is a schematic view of a measuring device comprising a first unit 1, a transducer 5 and a second unit 2 for controlling the measuring device.

first units 1, which do not have digital, wired communication, but function using analogue interfaces, for example the 4 to 20-mA current loop or with 0 to 5 V DC voltage, are not directly able to modify a measuring condition, for example in the form of a measuring interval, of setting the amplification or of the measured-value filter strength, to start or stop the measurement, or to output status information via said analogue interfaces. The second unit 2 allows such functions to be activated, configured and/or read out. In this case, the first unit 1 can operate the transducer 5, for example, at a new measuring interval by means of the second unit 2. This occurs when the second unit 2 enters the coupling range of the transceiver unit of a first unit 1. For this purpose, the second unit 2 can also be provided with keys 6 and/or with a screen (e.g. ink display), also in the form of a touchscreen. Keys and a screen are connected to the data-processing system of the second unit such that a specific operating mode of the data-processing system can be triggered or terminated. This operating mode is transmitted to the data-processing system of the first unit 1 so that the operating mode of the active measuring functional unit 1 and of the transducer 5 can be changed accordingly. By means of the screen or lamp, the particular operating mode can be controlled and/or influenced. Alternatively to interactive keys, the passive functional unit can also transmit specific configurations automatically such that it is sufficient to bring the two transceiver units in the radio range.

Figure 4:
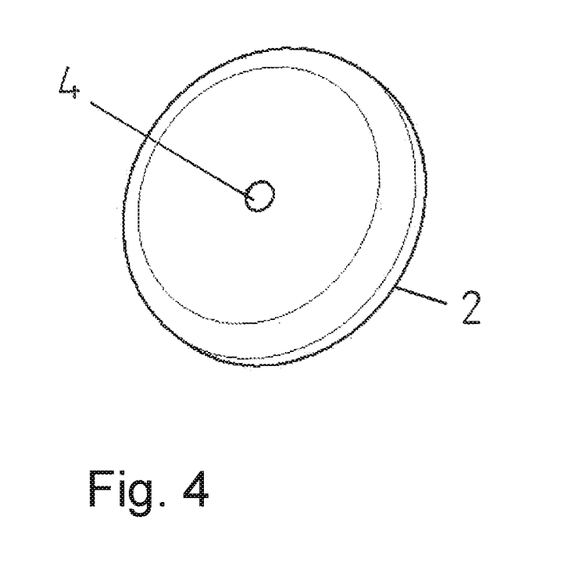
FIG. 4 shows a second unit in the form of an information means.

FIG. 4 is a schematic view of a second unit 2 in the form of an information means.

In a third embodiment, the second unit 2 is an information means relating to the status of the measuring device or a combination of the configuration and/or the transfer of commands and the associated status information. Measuring devices or sensors in the form of a subassembly of measuring devices consisting of the first unit 1 and at least one transducer 5, often do not comprise integrated indicators. This can be for economic reasons, on account of sealing requirements for the sensors, material problems, measures relating to explosion protection or environmental conditions (for example sensors for use in water in sewage plants, which are submerged in the water). It is also essential that various applications do not to allow permanent access to the sensors, and therefore such indicators are useless.

However, there is often a temporary need to have the status directly displayed on the sensor.

For this purpose, the second unit 2 can advantageously be used. Said device contains an indicator in the form of at least one lamp 4 or a display. For this purpose, the second unit 2 can be formed as a key, in the form of a card, as an armband, as a key ring or as a tag. For this purpose, the lamp can in particular be a multi-coloured light-emitting diode. If the second unit enters the range of the transceiver unit of the first unit 1, the power required for the second unit 2 to operate can be transmitted and communication can be started. In this case, commands or configuration data can be exchanged and/or the status information relating to the data-processing system of the sensor 1 is transmitted to the second unit 2. In this case, the light-emitting diode is switched on via the data-processing system of the second unit 2 such that a colour or flash frequency assigned to the status is emitted.

Such an embodiment of the second unit 2 can advantageously be fixed to the transceiver unit for electromagnetic radiation of the first unit by a magnetic force (for example sintered NdFeb magnets) for continuous use or for the desired coupling time.

Figure 5:
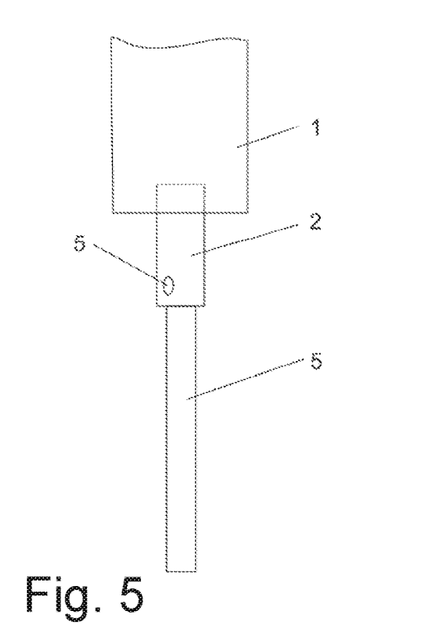
FIG. 5 shows a second unit comprising a transducer, which is mounted on a first unit.

FIG. 5 is a schematic view of a second unit 2 comprising a transducer 5, which is mounted on a first unit 1.

In this embodiment, the second unit 2 is formed having a pH electrode, for example, which is connected to the first unit 1 in the form of a replaceable element that is not in wired contact therewith and is galvanically isolated therefrom.

Power for the second unit including the transducer 5 is transferred by means of the transceiver units of the first unit 1 and of the second unit 2. Communication, i.e. the exchange of data, also takes place via this path.

The electrode, i.e. the transducer 5, together with the associated second unit 2 is thereby robustly connected to the first unit 1 so as to be galvanically isolated therefrom and so that it can be replaced.

Additional transducers, for example in the form of temperature sensors, in the second unit 2 can be directly processed by means of the data-processing system in the second unit 2 and thus allow for the reduced transmission of data (measured values) to the first unit 1.

As a result of the simultaneous use of a plurality of passive functional (second) units, for example as a result of the use of an additional second unit in the form of a cuvette, calibration in accordance with the representations in FIGS. 1 and 2 and the above-described use example can also take place in this use example.

Figure 6:
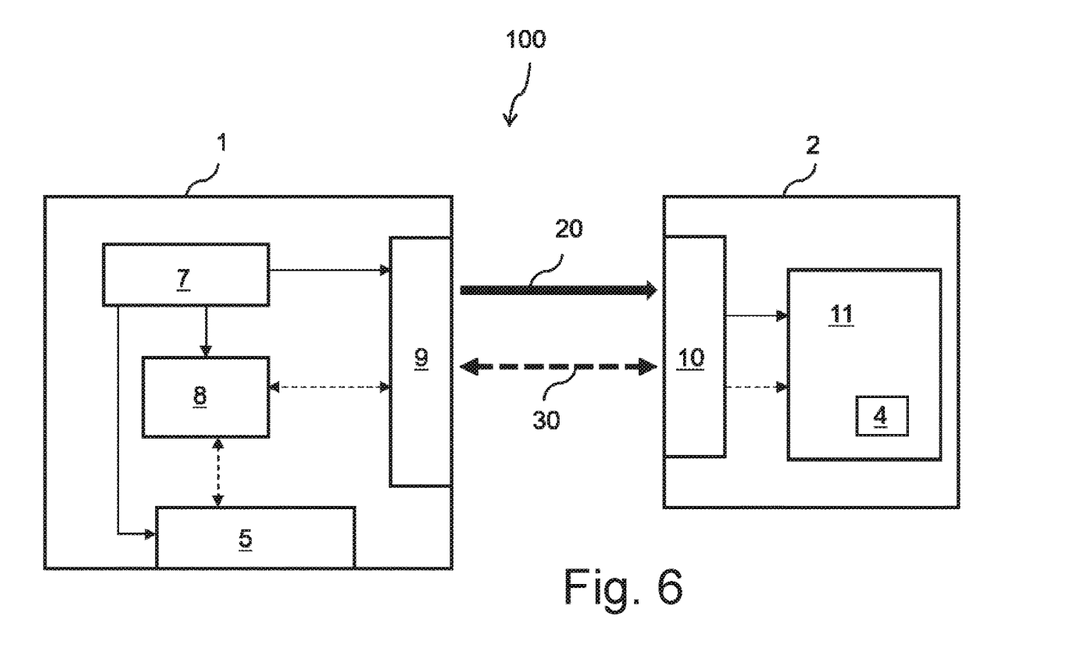
FIG. 6 shows a schematic diagram of an embodiment of the system according to the invention.

FIG. 6 shows a schematic diagram of an embodiment of the system according to the invention. The system 100 comprises a first unit 1 and a second unit 2 and a transducer 5, which is a part of the first unit 1 in the shown embodiment. In other embodiments, the transducer comprised by the system 100 may be a part of the second unit 2, or both of the first unit 1 and the second unit 2 may contain a transducer, i.e. the system 100 contains two transducers. It is also possible that the first unit 1 or the second unit 2 contain more than one transducer.

The first unit 1 comprises a power source 7 and a data-processing system 8. Further, the first unit 1 comprises a first transceiver unit 9 configured to transmit and receive electromagnetic radiation. The power source 7 provides power to the data-processing system 8, the transducer 5 and the first transceiver unit 9 of the first unit 1 as indicated by solid arrows within the first unit 1. The data-processing system 8 controls the operation of the transducer 5 and of the first transceiver unit 9 and therefore sends signals and data, for instance data to be transmitted by the first transceiver unit 9, to the respective components as indicated by broken arrows within the first unit 1. On the other hand, the transducer 5 also sends signals and data, for instance measured values, to the data-processing system 8 and the first transceiver unit 9 sends received signals and data to the data-processing system 8. Therefore, the broken arrows indicating path of information, i.e. signals and data, are shown as double arrows.

The second unit 2 comprises a second transceiver unit 10 configured to transmit and receive electromagnetic radiation and a feedback device 11 containing, for instance, a lamp 4. In the shown embodiment, the second unit 2 further comprises a data-processing system 12 and a data store 13. The second transceiver unit 10 sends power and signals to the data-processing system 12 and power to the feedback device 11 and the data store 13 as shown by arrows within the second unit 2. The data-processing system 12 processes data received by the second transceiver unit 10 and controls the operation of the feedback device 11 and the data store 13 by sending respective control signals to the respective components. The data-processing system 12 may receive data from the data store 13 and may send data to the data store 13 to be stored within the data store 13. Further, the data-processing system 12 controls the second transceiver unit 2 such as to transmit data.

However, the second unit 2 does not comprise an own power source. Therefore, the components of the second unit 2 may operate only when the second transceiver unit 10 receives power from outside the second unit 2. This is the case when the second unit 2 is in the near field of the first unit 1. Then, the first unit 1, in particular the first transceiver unit 9, sends power 20 to the second unit 2, in particular to the second transceiver unit 10. As soon as the components of the second unit 2 get enough power for operating, information 30, i.e. data and signals, may be transmitted between the first unit 1 and the second unit 2.

In any case, transmission paths for power are indicated by solid arrows and transmission paths for information are indicated by broken arrows.

Figure 7:
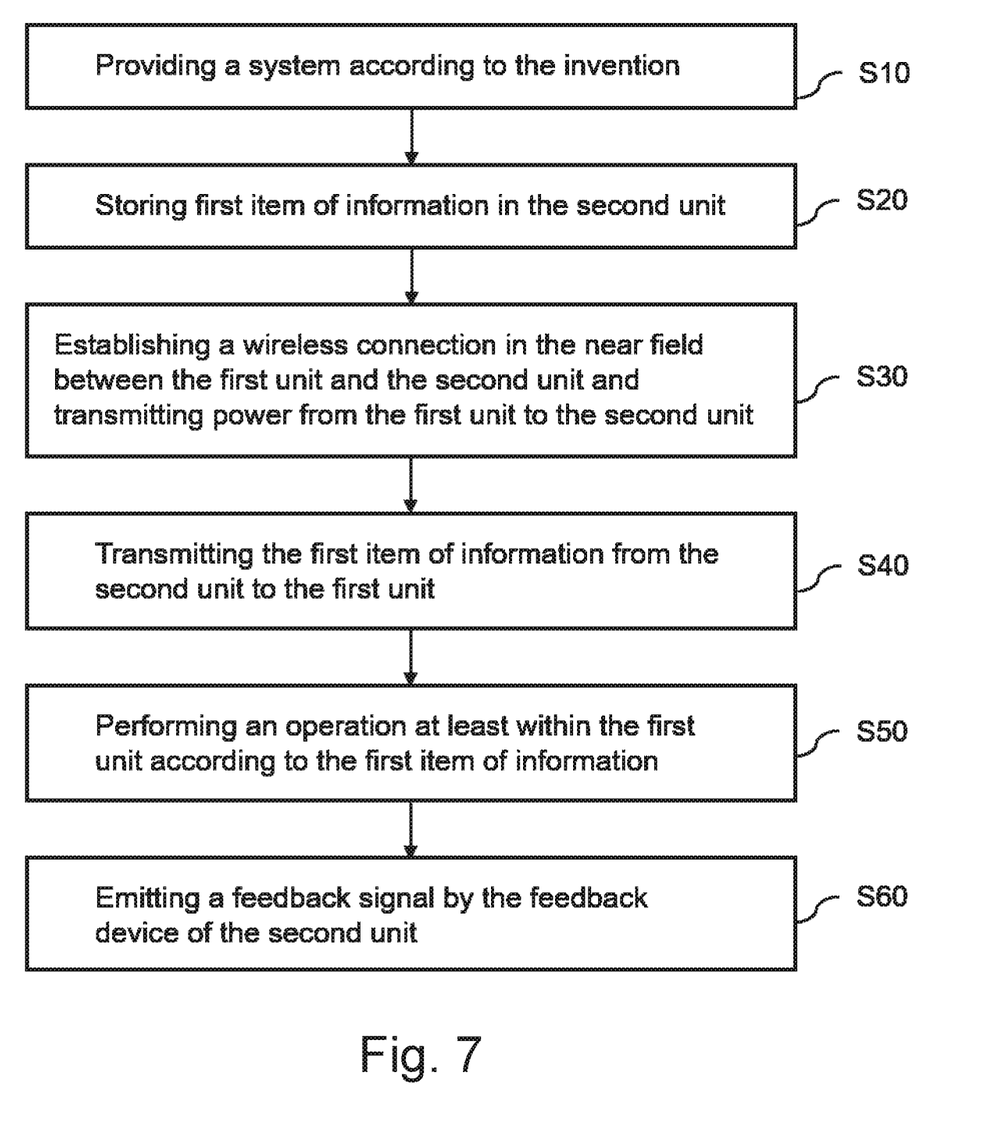
FIG. 7 shows an embodiment of the method according to the invention in a flow chart.

FIG. 7 shows a flow chart of an exemplary embodiment of the method according to the invention. First, in step S10, a system according to the invention is provided. In this step, the first unit and the second unit may be locally separated from each other. That is, the first unit may be a temperature sensor comprising a respective transducer for measuring a water temperature and a data-processing system configured to control the measurement operation of the transducer and to process measured values. The first unit may be a part of a fish farm station comprising a plurality of first units, for instance more than 20, and is able to send data, e.g. the measured values or processed data based on the measured values, to a control station, which may be located far away from the first unit and which is not part of the system according to the invention. In order to be able to perform the mentioned functions, the first unit comprises an energy source, e.g. it is connected to an electric mains provided for all first units of the fish farm. The second unit may be a hand-held device, like a chip card or a tag. The second unit may be provided be a firm which is responsible for maintaining the first units, but which is not the company operating the fish farm.

In step S20, the first item of information explained above is stored in the second unit. This may be done far away from the fish farm at a company site of the maintenance firm by a skilled person, e.g. an engineer. Then, the second unit may be sent per post to the fish farm company and an employee of the fish farm company may take the second unit to the place of the fish farm. This employee has not to be a skilled person like an engineer, it can also be an unskilled person.

In step S30, a wireless connection between the first transceiver unit of the first unit and the second transceiver unit of the second unit in the near field of the first unit is established. This is done by the employee just by bringing the second unit into the nearness of the first unit. It might be that the employee has to remove the first unit from the water. As soon and as long as the wireless connection is established, power is automatically transmitted from the first unit to the second unit, thereby allowing the second unit to do something. If no power is transmitted, the second unit is passive, in particular it does not transmit or receive any information to or from outside. Thus, information stored within the second unit cannot be altered without a power transmission. In order to prevent unintended access to the second unit by providing a power transmission by an unauthorized person, the information stored on the second unit may be secured, e.g. by identification data or by a safety routine assuring that an authorized activation of the second unit is given.

Provided that an authorized activation is given, the first item of information stored in the second unit is transmitted to the first unit via the wireless connection in step S40. Thus, for instance, a new software program for the data-processing system of the first unit can be transmitted together with control commands which cause the implementation of the new software program into the first unit can be transmitted to the first unit.

In step S50, an operation is performed at least within the first unit according to the transmitted information. That is, the new software program is implemented into the data-processing system of the first unit in the given example.

As soon as the wireless connection is established, i.e. the second unit is activated, the second unit may give a feedback to the employee via the feedback device, which is step S60.

By way of example, the feedback device may emit a first signal, when the wireless connection is established and the first transmitting unit is ready for receiving information, and/or the feedback device may emit a second signal, when the second transmission unit completely transmitted the first item of information to the first unit, and/or the feedback device may emit a third signal, when the new software program is successfully implemented into the data-processing system of the first unit. Thus, the employee may recognize the status of the system and may track the operations and their successful execution in an easy way without doing more than secure the wireless connection. In particular, there is no need for communication with an employee in the control station to recognize whether the operation is done or not. Although step S60 is shown following step S50 in FIG. 6, step S60 might be performed at any time after step S30.

If the intended operation is executed, the employee may interrupt the wireless connection between the first unit and the second unit just by removing the second unit from the near field of the first unit, e.g. by bringing the first unit back into the water. Subsequently, the employee may perform step S30 with another first unit, thereby automatically performing also steps S40 to S60 with respect to this other first unit. Thus, the employee may perform the intended operations to all first units which are intended to without much effort and in a short time.

If anything is done at the place of the fish farm, the second unit may be returned to the maintenance firm. The maintenance firm may then analyze data transmitted from the first unit(s) to the second unit and/or may reuse the second unit, e.g. by storing new first items of information on it.

This exemplary embodiment of the method according to the invention only serves for explaining the advantages and possible uses of the system according to the invention and is nowise limiting the scope of the invention.

LIST OF REFERENCE NUMERALS 1. first unit/sensor
2. second unit
3. cuvette
4. lamp
5. transducer
6. key(s)
7 power source
8 data-processing system of the first unit
9 first transceiver unit
10 second transceiver unit
11 feedback device
12 data-processing system of the second unit
13 data store
20 power
30 information
100 system

The invention claimed is:

1. A system, comprising:
a first unit comprising a transducer configured as a sensor, an electrical power source, at least one data-processing system and a first transceiver unit for electromagnetic radiation; and
a second unit that is releasably connectable to the first unit and void of an electrical power source, the second unit comprising a second transceiver unit for electromagnetic radiation and a feedback device that is configured to emit at least one of a visual and an acoustic alert signal to a user,
wherein the first transceiver unit and the second transceiver unit are configured to be wirelessly connected, via an electromagnetic coupling in the near field, such that power is transmitted from the first unit to the second unit, and signals or data are transmitted between the first unit and the second unit,
wherein the second unit is configured as a calibration device to facilitate calibration of the sensor such that the sensor is in contact with a calibration medium comprising a liquid and/or a gas contained within the second unit when the second unit is releasably connected with the first unit, and the feedback device of the second unit emits a visual and/or an acoustic alert signal to a user, related to a calibration operation performed by the first unit, based on the signals or data transmitted between the first unit and the second unit.

2. The system according to claim 1, wherein the user feedback device is a lamp or a display.

3. The system according to claim 1, wherein the user feedback device is an acoustic system.

4. The system according to claim 1, wherein the electrical power source of the first unit is electric mains, an accumulator, a power store, a power converter or a combination thereof.

5. The system according to claim 1, wherein the transducer is an electrochemical sensor, a biochemical sensor, an optical sensor, a semiconductor sensor, a solids sensor, a microsystem, an electrode, an optrode, a physical sensor element or a combination thereof.

6. The system according to claim 1, wherein the second unit further comprises a data-processing system.

7. The system according to claim 1, wherein the second unit comprises a switch and is configured to start, select or end a calibration function in the first unit that calibrates the sensor.

8. The system according to claim 1, wherein the second unit contains an operating element configured to be controlled directly by a user.

9. The system according to claim 8, wherein the operating element of the second unit is a key or a switch or a touch screen in conjunction with a data-processing system of said second unit.

10. The system according to claim 1, wherein the second unit comprises a data store containing data in the form of times, identification data, codes, reference values, actual values, software, mathematical functions, linearisation parameters, calibration parameters, or algorithms for influencing the data-processing system of the first unit.

11. A method for transmitting information between a first unit and a second unit, comprising:
providing a system according to claim 1,
storing at least one first item of information in a data-processing system of the second unit,
establishing a wireless connection between the first transceiver unit and the second transceiver unit in the near field of the first unit, and transmitting power from the first unit to the second unit,
transmitting the at least one first item of information to the first unit via the transmitted signals or data via the wireless connection,
performing a calibration operation of the sensor of the first unit according to the transmitted at least one first item of information, and
at any point of time after establishing the wireless connection, emitting the visual and/or an acoustic signal to the user via the user feedback device based on the calibration operation to provide feedback to the user thereof.

12. The method according to claim 11, wherein the at least one first item of information is an item from the group consisting of identification data, configuration data, compensation data, software codes, control commands and calibration data.

13. The method according to claim 11, wherein the calibration operation comprises:
the second unit requesting the status of the first unit or of the transducer or requesting stored data of the first unit or of the transducer of the first unit; and
transmitting at least one second item of information from the first unit to the second unit via the wireless connection, wherein the second item of information is at least one from the group consisting of status data of the first unit or of the transducer of the first unit or stored data of the first unit or of the transducer of the first unit.

14. The method according to claim 11, wherein the calibration operation comprises:
transmitting measured values of the transducer of the first unit from the first unit to the second unit via the wireless connection; and
transmitting at least one of configuration data, compensation data, control commands and calibration data from the second unit to the first unit via the wireless connection.

15. The method according to claim 11, wherein the calibration operation comprises transmitting at least one second item of information from the first unit to the second unit and storing the second item of information in the second unit.

16. The system according to claim 1, wherein the first unit is void of a user feedback device that is configured to emit a visual and/or an acoustic alert signal to the user related to the operation of the first unit.

17. The system according to claim 1, wherein the system further comprises a control unit that is remote from the first unit and the second unit, and wherein the control unit is configured to monitor and display a status of at least the first unit to a secondary user that differs from the user.

18. The system according to claim 1, wherein the first and second units are configured such that the signals or data transmitted between the first and second units at least one of updates the operation of the sensor and causes the sensor to perform a sensing operation, and wherein the user feedback device of the second unit emits the visual and/or an acoustic alert signal to the user based on at least one of a successful calibration operation.

19. The system according to claim 1, wherein the first unit is void of a user feedback device that is configured to emit a visual and/or an acoustic alert signal to the user related to the calibration operation and other operation statuses of the first unit.

20. The system according to claim 1, wherein the second unit comprises a cuvette containing the calibration medium.

21. The system according to claim 1, wherein the first and second units are configured such that the calibration medium is on the sensor when the second unit is releasably physically connected with the first unit, and the calibration medium is not on the sensor when the second unit is physically disconnected with the first unit.

22. The system according to claim 1, wherein the calibration medium comprises a gas.

23. The system according to claim 1, wherein the calibration medium comprises a liquid solution.

24. The system according to claim 1, wherein the first unit is configured to perform the calibration operation that calibrates the sensor when the second unit is releasably connected with the first unit, wherein the first unit is configured to measure a value of a parameter of the calibration medium via the sensor as part of the calibration operation, and wherein the first unit is configured to measure a value of a parameter of an environment which the first unit is in when the second unit is disconnected from the first unit.

25. The system according to claim 24, wherein the second unit comprises a cuvette containing the calibration medium, and wherein the first and second units are configured such that the calibration medium is on the sensor when the second unit is releasably physically connected with the first unit, and the calibration medium is not on the sensor and the environment is on the sensor when the second unit is physically disconnected with the first unit.

26. The system according to claim 1, wherein the second unit is configured such that the sensor is in physical contact with the calibration medium comprising the liquid and/or the gas contained within the second unit when the second unit is releasably connected with the first unit.

27. A system, comprising:
a first unit comprising a transducer configured as a sensor, an electrical power source, at least one data-processing system and a first transceiver unit for electromagnetic radiation; and
a second unit that is releasably connectable to the first unit and void of an electrical power source, the second unit comprising a second transceiver unit for electromagnetic radiation and a feedback device that is configured to emit at least one of a visual and an acoustic alert signal to a user,
wherein the first transceiver unit and the second transceiver unit are configured to be wirelessly connected, via an electromagnetic coupling in the near field, such that power is transmitted from the first unit to the second unit, and signals or data are transmitted between the first unit and the second unit,
wherein the second unit is configured as a calibration device to facilitate calibration of the sensor such that the sensor is in contact with a calibration medium contained within the second unit when the second unit is releasably connected with the first unit, and the feedback device of the second unit emits a visual and/or an acoustic alert signal to a user, related to a calibration operation performed the first unit, based on the signals or data transmitted between the first unit and the second unit, and
wherein the second unit comprises a calibration cuvette containing the calibration medium.

28. The system according to claim 27, wherein the calibration medium comprises a physical calibration medium, and the calibration cuvette contains the physical calibration medium.

29. The system according to claim 27, wherein the physical calibration medium comprises a liquid and/or a gas.

30. The system according to claim 27, wherein the first and second units are configured such that the calibration medium is on the sensor when the second unit is releasably physically connected with the first unit, and the calibration medium is not on the sensor when the second unit is physically disconnected with the first unit.

* * * * *